INVENTOR.
PETER D. SCHWARZ

June 7, 1966 P. D. SCHWARZ 3,255,434
VEHICLE DETECTION AND COUNTING SYSTEM
Filed Nov. 1, 1961 4 Sheets-Sheet 2

INVENTOR.
PETER D. SCHWARZ
BY
Attorney

INVENTOR.
PETER D. SCHWARZ

INVENTOR.
PETER D. SCHWARZ

United States Patent Office 3,255,434
Patented June 7, 1966

3,255,434
VEHICLE DETECTION AND COUNTING SYSTEM
Peter D. Schwarz, 61 Woodcrest Drive,
Rochester 10, N.Y.
Filed Nov. 1, 1961, Ser. No. 149,460
3 Claims. (Cl. 340—38)

This invention relates to a novel vehicle detection system, and more particularly to a novel detection apparatus employing acoustical energy for detecting objects such as vehicles passing along a selected roadway.

The system with which the present invention is concerned, is intended primarily, but not necessarily exclusively for use in counting vehicles in parking garages and similar facilities, for detecting the vehicles as they enter and leave, and actuating appropriate totalizers and indicators to facilitate operation of the garage and control of the traffic therein. The system includes means for projecting acoustical energy pulses in the ultrasonic frequency range downwardly upon the roadway from a fixed position above the roadway, and means for detecting portions of the energy pulses reflected upwardly toward the fixed position. The presence or absence of a vehicle in the roadway at any particular moment is ascertained by measuring the time between the production of the energy pulses and the response of the detecting means to the reflected energy portion. Sound travels through the atmosphere at a relatively uniform, finite speed, so that when there is a vehicle in the roadway, the reflected energy is returned to the detecting means sooner than when there is no vehicle in the roadway.

One important object of the present invention is to provide a novel ultrasonic vehicle detector apparatus which is highly accurate and reliable in operation, capable of continued reliable operation under even highly adverse environmental conditions, and including means for maintaining its accuracy despite unpredictable changes in its environment.

Another object is to provide a novel ultrasonic vehicle detector system including means for compensating for differences in the reflecting properties of different portions of a vehicle, which differences are apt to produce signal fading effects as the different portions pass successively by the detector unit.

Another object is to provide novel apparatus of this type including means for compensating for unpredictable variations in operating conditions and for changes in the components of the apparatus such as may be due to aging and the like.

Another object is to provide novel apparatus of this type including means for automatically compensating for changes in atmospheric conditions such as may result in substantial changes in the speed of sound.

Another object is to provide a novel vehicle detection apparatus of this type which permits the use of plural, adjacently disposed detection units, with minimum susceptibility to counting error due to so-called acoustical cross-talk between them.

Another object is to provide novel apparatus of this type including a relatively simple, coordinated circuit timing arrangement enabling the apparatus to distingush between signals reflected from the roadway floor and signals reflected from a vehicle by reason of the differences between the elapsed times from the production of the energy pulses to the reception of the reflected portions thereof; and in general to provide novel apparatus of this type which is of relatively simple and inexpensive construction, yet highly reliable in operation and having a minimum susceptibilty to error.

The foregoing and other objects and advantages of the invention will become apparent from the following detailed description of a representative embodiment thereof, taken in conjunction with the drawings, wherein.

Figure 1:
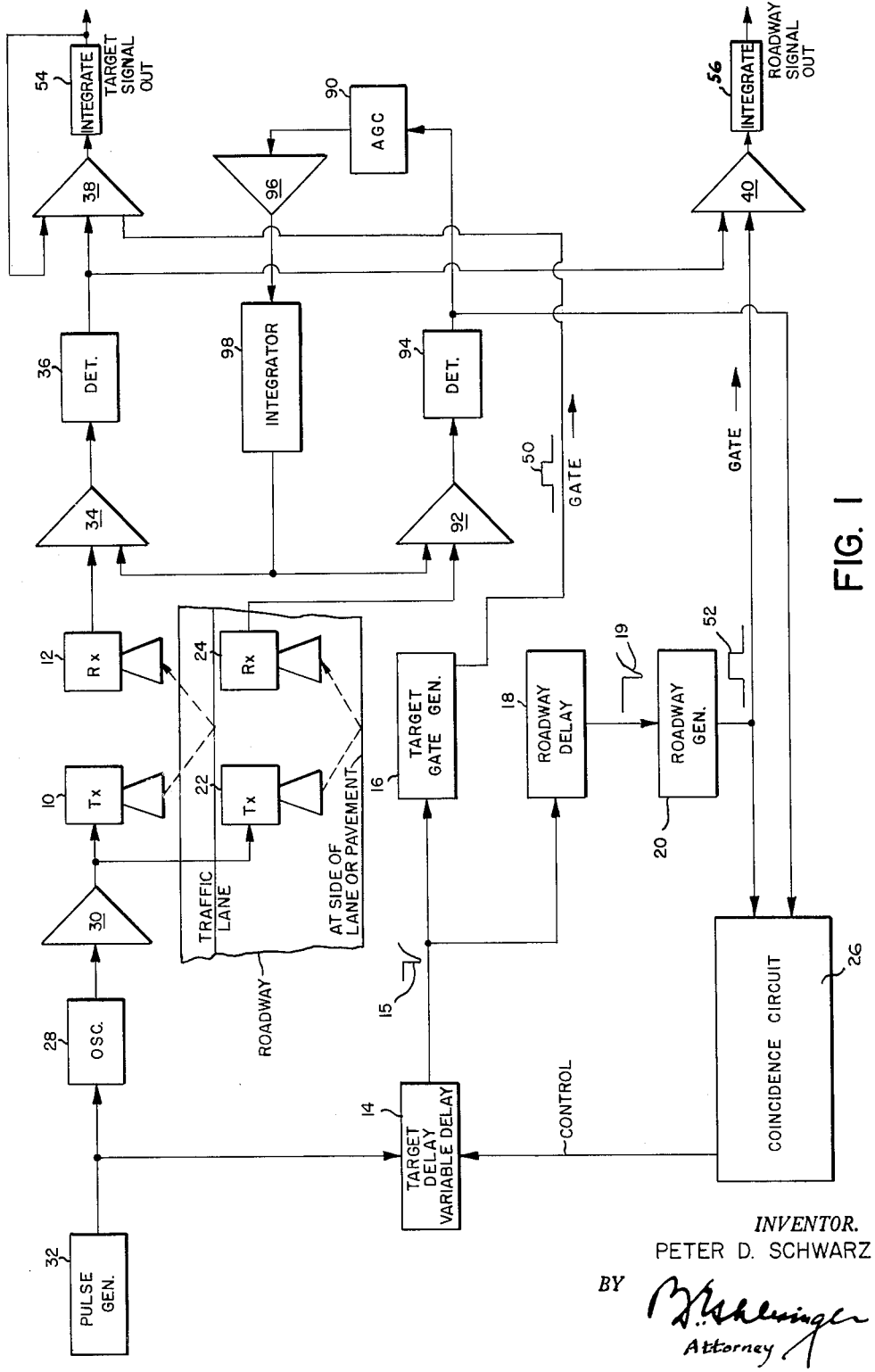
FIG. 1 is a schematic block diagram of an ultrasonic vehicle detector system constructed according to one embodiment of the present invention.

The traffic detection system described herein includes at least one pair of electro-acoustical transducers arranged in juxtaposed position above each roadway along which vehicles to be counted pass. One of the transducers of each pair is periodically energized at a relatively rapid repetition rate to transmit a series of relatively short, time-spaced pulses of ultrasonic acoustical energy downwardly toward the roadway. The other transducer is arranged to operate as a sensor to produce an electrical signal in response to acoustical energy received by it, particularly portions of the transmitted pulses that are reflected upwardly from the roadway or from vehicles passing therealong.

Sound travels through the atmosphere at a finite speed of about 1100 feet per second, and, accordingly, the elapsed time between the production of an energy pulse by the first transducer and the reception of the reflected portion at the second transducer constitutes a measure of the distance between the transducers and the reflecting surface. If there is a vehicle on the roadway beneath the sensor, the elapsed time will be relatively short, because the transmitted energy is reflected from a surface of the vehicle that is relatively close to the transducers. If there is no vehicle, the elapsed time is relatively long, because the energy must travel the full distance from the transducer pair to the roadway floor and return before the reflected portion is received.

The electrical signals generated by the second transducer are fed to a gated amplifier, which is arranged for producing an output signal in response to predetermined changes in the elapsed time between each energization of the first transducer and the production of the next following electrical signal by the second transducer, thereby to actuate an indicator to denote the passage of a vehicle along the roadway.

The present invention has to do primarily with synchronizing means for timing the gating of the amplifier relative to the energization of the first transducer, and with certain other novel circuit arrangements which provide improved operation of the amplifier, particularly with regard to stability and reliability, and to insuring against error in counting such as may be caused by acoustical cross-talk between adjacently disposed detector units.

Briefly, the invention contemplates the provision of a novel synchronizing arrangement, for a two-channel gated amplifier, the arrangement including a first, or master delay circuit, which times both of the gate producing circuits. The first gate is triggered directly by the master delay circuit, and means are provided for triggering the second gate at a predetermined time following the output trigger of the master delay circuit. The arrangement is relatively simple and requires only a relatively small number of circuit stages. A second feature of the invention relates to a positive feed-back arrangement, which in the embodiment described herein includes means for increasing the sensitivity of one amplifier channel upon reception of a signal through that channel, thereby reducing the chance of losing the signal output due to subsequent fading of reception such as may be caused by the presence of a vehicle at the edge of the detection zone. A third feature includes provision for automatically compensating for changes in signal strength such as may be occasioned by weather changes or the like. A fourth feature includes means for automatically compensating for unpredictable changes in the speed of sound such as may be caused by changes in humidity or atmospheric pressure, and in the embodiment shown includes a coincidence circuit for detecting and for correcting for any difference between the time of reception of the acoustic signal reflected from the roadway floor and the start of the gate for the corresponding amplifier channel. The correction is applied to the master delay circuit so as to correct the timing of both of the gates simultaneously.

Referring now to the drawings, FIG. 1 is a box diagram of a traffic detector system for use in a parking garage or the like. The system produces output signals which may be fed to computing and indicating apparatus for producing an indication in any desired form of the total number of vehicles or available spaces in the garage. Commonly, such computing and indicating apparatus includes a series of interconnected electrical relays, which are sequentially and alternatively operated in response to the output signals of the detector system to energize one or more solenoids, which, in turn, actuate a counter or totalizer. The computing and indicating apparatus per se may be arranged as desired, and will not be described in detail herein, since it forms no part of the present invention. One suitable system is, however, described in my copending patent application, Ser. No. 817,235, filed June 1, 1959, and entitled Traffic Counting Apparatus, now Patent No. 3,105,221.

The detector system shown in FIG. 1 includes a first transducer 10 for generating ultrasonic energy pulses, a second transducer 12 for producing an electrical signal in response to received energy, a two-channel gated amplifier for amplifying electrical signals produced by the second transducer 12, a pair of delay circuits 14 and 18 for timing the gating of the two amplifier channels relative to the energization of the first transducer 10, a pair of gate generating circuits 16 and 20 for gating the respective amplifier channels, a pair of auxiliary transducers 22 and 24 with related circuit components for controlling the gain of one channel of the amplifier, and a compensating circuit 26 for automatically adjusting the timing of the delay circuits.

The first transducer 10 is periodically energized through a power amplifier 30 by an oscillator 28, which is periodically driven by a pulse generator 32. The pulse generator 32 may be of any desired type such as, for example, a free running blocking oscillator arranged to produce relatively short time-spaced pulses of electrical energy so that the oscillator 28 and the transducer 10 are periodically energized to produce relatively short time-spaced pulses of ultrasonic energy. The transducer 10 is preferably arranged above the roadway of the garage or other parking area, and is of a directional type to concentrate its energy output downwardly toward the roadway and toward vehicles passing beneath it along the roadway.

A portion of the energy in each pulse is reflected upwardly from the roadway or from a vehicle beneath the transducer 10 on the roadway, and is sensed by the second transducer 12, the output of which is fed to an amplifier 34 and then to a detector 36. The detector 36 removes the ultrasonic frequency component from the signal and passes the signal on in the form of a direct current pulse of relatively brief duration to a pair of gated amplifiers, or channels 38 and 40, which are gated in timed relationship to the energization of the first transducer 10.

The amplifiers 38 and 40 may be of any desired type capable of being gated, that is, of being selectively disabled and enabled by the selective application of predetermined voltages between selected terminals of the amplifier. The voltages applied to enable the amplifiers to produce output signals in response to applied input signals are the gates, and during the application of the gates, the amplifiers are regarded as in an ON condition. In the absence of a gate the amplifiers are disabled, and are regarded as being in an OFF condition, because they are then incapable of producing an output signal in response to an applied input signal.

The first amplifier 38 is gated ON by the target gate generator 16 during the time energy reflected from a vehicle in the roadway would be received by the sensing transducer 12. The second amplifier 40 is gated ON by the floor gate generator 20 during the time reflected energy would be received from the floor of the roadway. At all other times, the two amplifiers 38 and 40 are maintained in an OFF, or disabled condition.

The amplifiers 38 and 40 are each gated ON once following each energy pulse produced by the transmitting transducer 10. The target delay circuit 14 is triggered by the pulse generator 32, which also controls the energization of the oscillator 28. The target delay circuit 14 produces a trigger output signal 15, which triggers the target gate generator 16 to initiate the target gate 50. The output signal 15 of the target delay circuit 14 is also applied to the floor delay circuit 18, which produces a trigger output signal 19 at a predetermined time after the target delay output signal 15. The floor delay output signal 19 is fed to the floor gate generator 20 to trigger it and initiate the floor gate 52. The pulse generator 32 is arranged to allow time for this full sequence between each two successive pulses delivered by it to the oscillator 28, so that the transmitting transducer 10 is not again energized until after the end of the floor gate 52.

Figure 2:
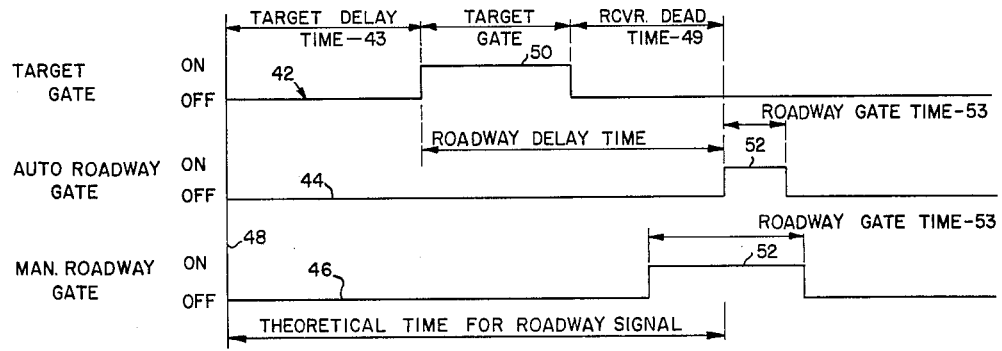
FIG. 2 is a chart illustrating diagrammatically the timing of the circuit shown in FIG. 1.
Figure 3:
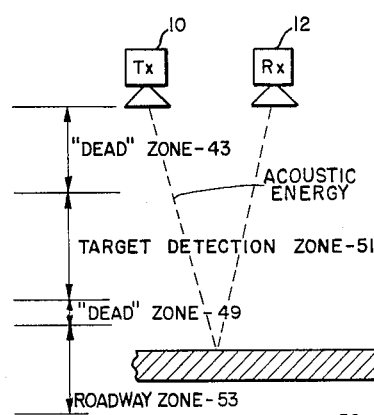
FIG. 3 is a diagram illustrating the relationship between the timing of the circuit and the location of the reflecting objects relative to the detector.

The relationship between the gating of the two amplifiers 38 and 40 is shown diagrammatically in FIGS. 2 and 3. The abscissa in FIG. 2 represents elapsed time from the start of each acoustical pulse produced by the transmitting transducer 10. The ordinate represents voltage. The diagram of FIG. 3 represents the correlation between elapsed time for transmission of sound and the distance between the transducers 10 and 12 and the reflecting surface in a typical installation.

In FIG. 2, the first line 42 illustrates the timing of the gate 50 for the first amplifier 38 relative to the energization of the transducer 10, and the second two lines 44 and 46, respectively, illustrate the timing of the gate 52 relative to the energization of transducer 10 for the second amplifier 40 in two different respective modes of operation. The second line 44 illustrates the gating of the second amplifier 40 when the automatic compensating circuit is in use, while the third line 46 illustrates the gating of the second amplifier 40 during times when the automatic compensating circuit is not in use.

It will be noted that the gates 50 and 52 for the respective amplifiers 38 and 40 are spaced apart in time, and that both amplifiers are disabled during energization of the transmitting transducer 10, the start of which is set at the origin of the chart. This arrangement insures against response of the circuit to electrical cross-talk and to energy transmitted directly from the transmitting transducer 10 to the receiving transducer 12.

The time spacing between the end of the first gate 50 and the start of the second gate 52 should also be noted. This spacing insures against confusion such as may otherwise be caused by the presence of relatively low objects in the roadway such as, for example, baby strollers, low trailers, or the like, which would cause reflected acoustical energy to be received by the receiving transducer 12 at times later, relative to the transmitted pulse, than the time energy would be received by reflection from a vehicle of the type it is desired to count.

For convenience, the first amplifier channel 38 is referred to herein as the target amplifier, its gate 50 as the target gate, and its output signal as the target signal, because the first amplifier is ON only during the time energy is expected to be received from a target such as a vehicle in the roadway. Similarly, the second amplifier channel 40 will be referred to hereinafter as the floor amplifier, since it is gated ON only for the reception of energy reflected from the roadway floor.

The various zones indicated in FIG. 3 correspond to the elapsed times shown in FIG. 2. The first "dead zone" 43 corresponds to the "target delay time," during and immediately following energization of the transmitting transducer 10. The target delay time is the time required for sound to travel from the transmitting transducer 10 to the bottom of the first "dead zone" 43 and, being reflected thereat, return to the receiving transducer 12. Both of the amplifiers 38 and 40 are OFF during this period, and no signal output can be produced by them. The "target detection zone" 51 corresponds to the duration of the target gate 50, during which time the first amplifier 38 is ON, and enabled to produce an output signal indicating the presence of a vehicle in the roadway if one is there. The target gate 50 is arranged to span the time required for sound to make a return trip between the position of the transducers 10 and 12 and an acoustically reflecting surface positioned at any height within the "target detection zone" 51 directly beneath the transducers. The second "dead zone" 49 represents the interval between the end of the target gate 50 and the beginning of the floor gate 52. The "floor zone" 53 corresponds to the duration of the floor gate 52, during which the second amplifier is ON and enabled to produce an output signal indicating the absence of a vehicle in the roadway.

The respective target and floor gates 50 and 52 may be produced by any desired type of gate generator circuit such as, for example, a phantastron, or a monostable multivibrator, as represented by the blocks 16 and 20 in FIG. 1. The target gate generator 16 is triggered directly by the master, or target delay circuit 14, which also may be of any desired type such as, for example, a phantastron capable of producing an output signal for triggering the target gate circuit 16 at a predetermined time after the reception of the initial starting signal from the pulse generator 32. Preferably, however, in order to facilitate operation with the automatic timing compensation feature of the present invention, the target delay circuit 14 is of the phantastron type, or some other type in which the length of the delay between its input and output signals may be adjusted by varying the voltage between two points in the circuit.

The output of the target delay circuit 14 also triggers another delay circuit 18 called the floor delay circuit, the delay characteristic of which need not be adjustable, and which produces an output signal for triggering the floor gate generator 20.

The floor gate generator 20 may be generally similar to the target gate generator 16, although the duration of its output gate 52 may be considerably shorter than the duration of the target gate 50, especially when the automatic timing compensation feature of the invention is in use. As will be more readily apparent hereinafter, when the automatic timing compensation feature is not in use, it is desirable to make the floor gate 52 relatively long in order to allow for effects of changes in atmospheric pressure and humidity, or other changes that may affect the speed of sound.

The outputs of the amplifiers 38 and 40 are integrated by respective integrators 54 and 56, and then fed to the computing and indicating apparatus (not shown) which may be as described in my hereinabove identified copending patent application, and which is preferably arranged to indicate a vehicle count only in response to a complete cycle of operation including gaining a target signal, losing the floor signal, and subsequently losing the target signal and regaining the floor signal. Thus, with such an arrangement, the system is not responsive to acoustical signals reflected by pedestrians, because pedestrians do not cause loss of the floor signal. Neither is it apt to produce an erroneous count due to the loss of the target signal during the passage of a vehicle such as may be caused by smooth, sloping reflective surfaces such as automobile windshields, or by poorly reflecting open tonneaus of convertibles with retracted roofs.

FEEDBACK FOR SENSITIVITY CONTROL

It often happens due to the effect of automobile bumpers, sloping hoods, pitching of vehicles, their starting and stopping at the edge of the detection zone, and the like, that the target signal may be subject to relatively severe fading, or weakening as a vehicle enters the detection zone beneath the transducers 10 and 12, and in order to avoid the possibility of an error in counting due to such fading of the target signal, the integrated target output signal is fed back to the target amplifier 38 to increase the sensitivity of the amplifier 38 from the time a target is first detected throughout the remainder of the cycle of counting.

Figure 4:
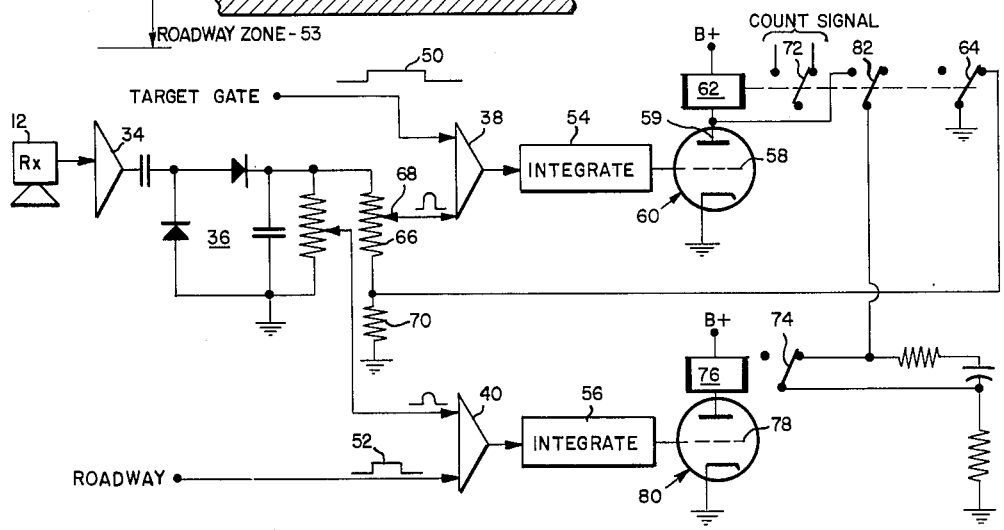
FIG. 4 is a schematic diagram of the output portion of the detector means, particularly showing the interconnections between the outputs of the two signal channels thereof.

An illustrative circuit for accomplishing this is shown in FIG. 4. In that circuit, the integrated output of the target amplifier 38 is fed to the control grid 58 of a triode vacuum tube 60, which is connected in series with an output relay called the target output relay 62, for controlling the energization of the relay. The tube 60 is normally biased beyond cut-off, and conducts only when the target signal is present. When the tube 60 conducts, the target output relay 62 is energized. A normally closed contact 64 of the target output relay is connected in the signal input circuit of the target amplifier 38 in such a way that an increased portion of the detected signal is fed to the amplifier 38 when the contact 64 is opened.

The output of the detector 36 appears between the upper terminal of a potentiometer 66 and a point of reference potential, which will hereinafter be referred to as ground. The slide contact 68 of the potentiometer 66 is connected to the input of the target amplifier 38. Normally, during periods when the target output relay 62 is deenergized, the lower terminal of the potentiometer 66 is connected directly to ground through the relay contact 64. When the target output relay 62 is energized and picks up, the contact 64 is opened, and the potentiometer 66 is then connected to ground through a relatively large value resistor 70 which then functions to increase the fraction of the detector output voltage that is applied to the target amplifier 38, thereby increasing the over-all sensitivity and minimizing the possibility of signal loss.

The output, or count signal in the apparatus as shown is constituted by one full cycle of operation of the first contact 72 of the target output relay 62. The count signal is initiated immediately upon reception of a target signal, regardless of whether or not the floor signal is lost. This mode of operation insures against missing a count due to acoustical cross-talk between adjacent detector units such as may cause the production of spurious floor signals.

In order further to insure that the target output relay 62 will not chatter and thereby produce spurious counts, a holding circuit is provided for it through the contact 74 of the floor output relay 76. The integrated output of the floor amplifier 40 is fed to the control grid 78 of a triode vacuum tube 80, which is connected in series with a floor output relay 76. During times when there is no vehicle in the roadway, the floor signal is present, the floor triode 80 is conducting, the floor output relay 76 is energized, and the contact 74 is held open. When a vehicle enters the detection zone, the target output relay 62 becomes energized, picking up all of its contacts, the second one 82 of which connects the plate 59 of the target triode to the contact 74 of the floor output relay. When the floor signal is subsequently lost, the floor output relay drops out, and the contact 74 closes, thereby completing a circuit to ground in parallel with the target triode 60 to hold the target output relay 62 energized and picked up so long as the floor signal is absent. The target output relay 62 can then become deenergized, and drop out only when both conditions are satisfied that the target signal is lost thereby causing the target triode 60 to cut off, and the floor signal is regained thereby causing the floor output relay 76 to become energized and to open the contact 74.

Thus, even though the target signal may be lost during the passage of a vehicle beneath the transducers 10 and 12, the target output relay 62 remains picked up until the floor signal is regained, which occurs only after the vehicle leaves the detection zone beneath the transducers, and a spurious count is avoided.

AUTOMATIC GAIN CONTROL

It has been found necessary in the operation of equipment of this type to adjust the amplifier gain at relatively frequent intervals to compensate for variations in signal strength due to unpredictable changes in environmental conditions. Such adjustments are made in the practice of the present invention automatically and continuously by means of an automatic gain control circuit 90 (FIG. 1) in response to changes in the strength of a signal produced by the auxiliary receiving transducer 24. The auxiliary transducers 22 and 24 in the embodiment shown are arranged similarly to the main transducers 10 and 12, but out of the flow of traffic to produce an auxiliary floor signal in response to each and every output pulse of the auxiliary transmitting transducer 22. The auxiliary transducers 22 and 24 are not used for detecting vehicles, but are provided for the purpose of producing a reference signal, which is used for adjusting the system.

The first auxiliary transducer 22 is energized synchronously with the first, or main transducer 10. The reflected energy from the floor is sensed by the second auxiliary transducer 24, which produces an electrical signal in response thereto. The signal is fed to an auxiliary amplifier 92 and then detected by an auxiliary detector 94. The output of the detector 94 is fed to the AGC circuit 90, which operates through another amplifier 96 and an integrator 98 to produce an output signal to vary the gain of the main amplifier 34 and of the auxiliary amplifier 92 in such a way as to maintain the output of the auxiliary detector 94 substantially constant. The amplifiers 34 and 92 are preferably generally similar, and are of the type in which the gain may be controlled by varying an input voltage.

Figure 5:
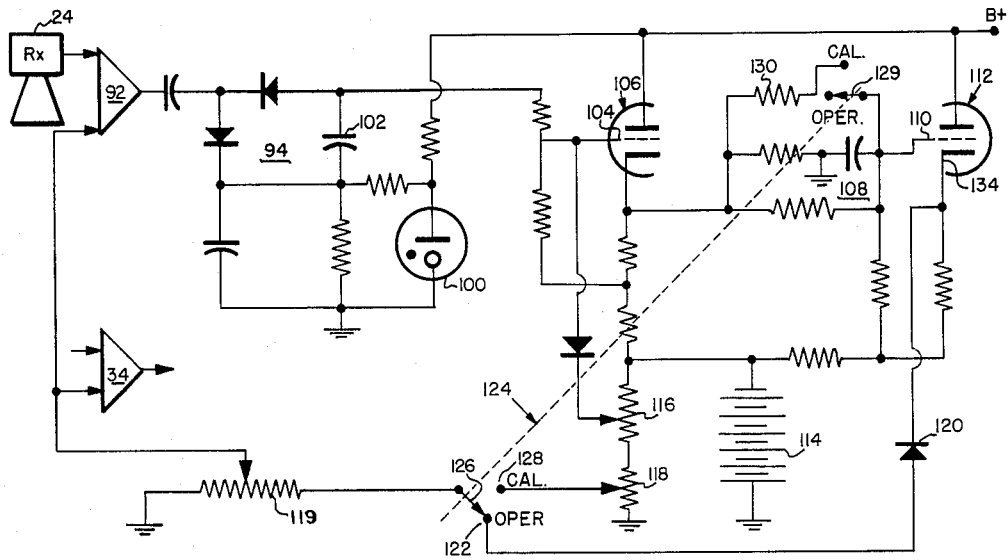
FIG. 5 is a schematic diagram of a portion of the detector means, particularly showing the arrangement for automatic gain control.

One illustrative automatic gain control circuit which has been found to provide satisfactory operation in the system shown in FIG. 1 is illustrated in FIG. 5. In this circuit, the detector 94 is biased, being connected to a voltage divider network connected between the B+ supply and ground. The gas diode 100 is included in the biasing network to stabilize the bias voltage applied to the detector 94. The output of the detector 94 appears across a capacitor 102 and is applied to the control grid 104 of a cathode follower triode 106. The output of the cathode follower 106 is integrated by a relatively long time constant, say about five or six minutes, integrating circuit 108, and fed to the control grid 110 of a second cathode follower 112. A negative power source 114 is included for biasing the cathode followers 106 and 112, and the grid bias for the first cathode follower 106 is taken from a voltage divider network including the variable resistors 116 and 118, which are series connected across the negative supply 114.

The output of the second cathode follower 112 is fed through a diode 120 to the first contact 122 of a two pole-two position switch 124. The gain control voltage for the main amplifiers 34 of all of the detectors in the particular parking garage or other installation, and the gain control voltage for the auxiliary amplifier 92 are taken through a variable resistor 119 from the first arm 126 of the switch 124, which in its first position engages the fixed contact 122.

When the switch 124 is moved from its first, or "operate" position 122 to its second, or "calibrate" position 128, the gain control voltage applied to the amplifiers 92 and 34 is taken from the variable resistor 118, and is of a steady value. The second arm 129 of the switch, when the switch is in its second, or "calibrate" position, connects a relatively small value resistor 130 across the integrating circuit 108, thereby reducing the integration time constant to a relatively low value of between about one and five seconds to enable the making of rapid calibration adjustments. The circuit is then adjusted by varying the tap of the variable resistor 118 to a position at which its potential is equal to a preselected value. The tap of the variable resistor 119 is then adjusted to bring the potential of the cathode 134 of the cathode follower to the same preselected value, whereupon the switch 124 is returned to its "operate" position. The circuit then operates to maintain the output of the auxiliary amplifier 92 at a substantially constant value. The switch 124 may be left in its "calibrate" position during times it is desired to operate the system without the automatic compensation feature.

Since the changes in the gain control voltage applied to the auxiliary amplifier 92 are also applied to the main amplifier 34 (FIG. 1) and since the auxiliary amplifier 92 is substantially identical with the main amplifier 34, and the auxiliary transducers 22 and 24 are operated under essentially similar conditions as the main transducers 10 and 12, substantially full compensation of the entire system is achieved for environmental changes and aging of circuit components that would otherwise produce undesirable changes in signal strength.

As hereinabove described, at least one pair of main transducers 10 and 12, along with their associated amplifiers, detectors, and output relays is provided for each lane of traffic it is desired to monitor. In large installations, therefore, many pairs of main transducers 10 and 12 are used, each producing their separate, respective count signal outputs, which may be fed to common computing and indicating apparatus. Regardless of the number of pairs of main transducers 10 and 12, however, only one auxiliary pair 22 and 24 need be provided. With the present system all of the amplifiers 34 in any given facility may be controlled by the gain control output voltage of the single AGC circuit 90, so that only one auxiliary system need be provided for automatic gain control purposes, regardless of the number of pairs of main transducers 10 and 12 in the entire facility.

THE TIMING COMPENSATING CIRCUIT

In the operation of vehicle detection systems of this type, it has been found that substantial variations in the speed of sound occur, due probably to changes in temperature, humidity, and atmospheric pressure. Such variations may at times be sufficient to disable the system or to produce occasional erroneous counts. In order to protect against such occurrences, the present invention contemplates including a compensating circuit in the system to adjust the timing of the gates 50 and 52 automatically and continuously, and to preserve the desired correlation between the timing of the target and floor gates and the respective target and floor zones as shown in FIGS. 2 and 3. The coincidence circuit 26 (FIG. 1) is provided for this purpose, and is arranged to produce a signal for controlling the target delay circuit 14 so that the leading edge of the floor gate 52 (FIG. 2) is kept in time coincidence with the floor signal; that is, the target delay circuit 14 is continuously adjusted to maintain time coincidence between the reception of the reflected energy pulse from the roadway floor and the gating ON of the floor amplifier 40.

Figure 6:
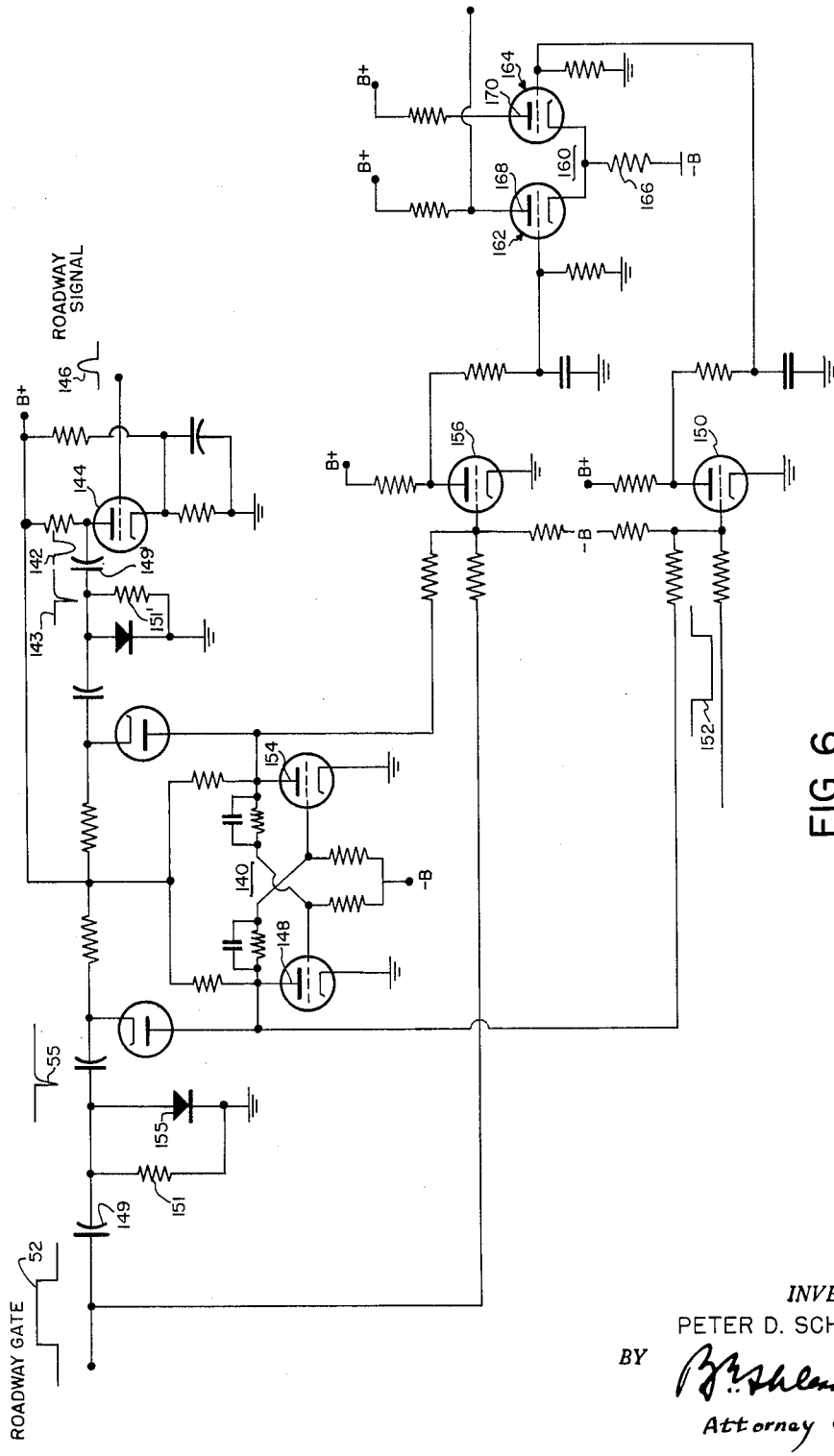
FIG. 6 is a schematic diagram of the coincidence circuit portion of the detector means.

One feasible coincidence circuit is shown in detail in FIG. 6 for automatically adjusting the delay circuits 14, 16, 18, and 20 to compensate for variations in the speed of sound, and for thereby improving the reliability and stability of the apparatus. The circuit shown includes a bi-stable multivibrator 140 connected to be triggered to one state of conduction in response to the negative-going trailing edge of the floor gate 52 (at the time the floor amplifier 40 is gated OFF) and triggered to the opposite state of conduction by the negative-going pulse signal 142 produced by an amplifier 144 in response to the positive floor pulse signal 146 produced by the auxiliary amplifier 92 and detector 94. The floor gate 52 is differentiated by a capacitor 149 and resistor 151 to produce the negative, pulse signal 55 coincidently with the trailing edge of the floor gate for triggering the multivibrator. The positive going pulse produced in response to the leading edge of the floor gate 52 is clamped out by the diode 155, which is connected across the resistor 151.

One output signal is taken from the left hand plate 148 of the multivibrator. A negative-going square wave signal 152 corresponding precisely in time to the positive going floor gate 52 is also fed to the coincidence circuit. A signal representing the algebraic sum of the output signal at the left hand plate 148 of the multivibrator and the square wave signal 152 is fed to the control grid of a first summing triode 150. The triode 150 is biased to cut off only when the negative gate 152 is present and the left hand plate 148 of the multivibrator is at its relatively negative potential. The left hand plate 148 of the multivibrator swings from its negative to its relatively positive potential in response to the floor signal 146. The triode 150 will, therefore, be cut off only when the floor signal 146 occurs later than the start of the floor gate 52, and only during the interval between the leading edge of the floor gate 52 and the occurrence of the floor signal 146.

Similarly, a signal representative of the algebraic sum of the floor gate 52 and the output signal from the right hand plate 154 of the multivibrator is fed to the grid of a second summing triode 156, which is biased to be cut off only when both the floor gate 52 is absent and the right hand plate 154 of the multivibrator is relatively negative. Thus, the second triode 156 cuts off only when the floor signal occurs earlier than the leading edge of the floor gate 52, and only for the interval between the occurrence of the floor signal 146 and the leading edge of the floor gate 52.

The outputs of the two summing triodes 150 and 156 are fed through integrating circuits to the respective opposite inputs of a differential amplifier 160, which, as shown, includes a pair of triode vacuum tubes 162 and 164 having a common cathode resistor 166. The control voltage for controlling the delay of the target delay circuit 14 is taken from one of the plates 168 and 170 of the differential amplifier, depending upon the control characteristics of the particular target delay circuit. Thus, for instance, if a negative-going voltage change applied to the control terminal of the target delay circuit 14 affects the delay circuit 14 in such a way as to decrease its effective delay time, then the control voltage is taken from the plate 168 of the triode 162 to which the output of the second summing triode 156 is applied. If, on the other hand, the target delay circuit 14 is such that a negative going change in its applied control voltage produces an increase in its delay characteristic, the control voltage will be taken from the other plate 170 of the differential amplifier.

Figure 7:
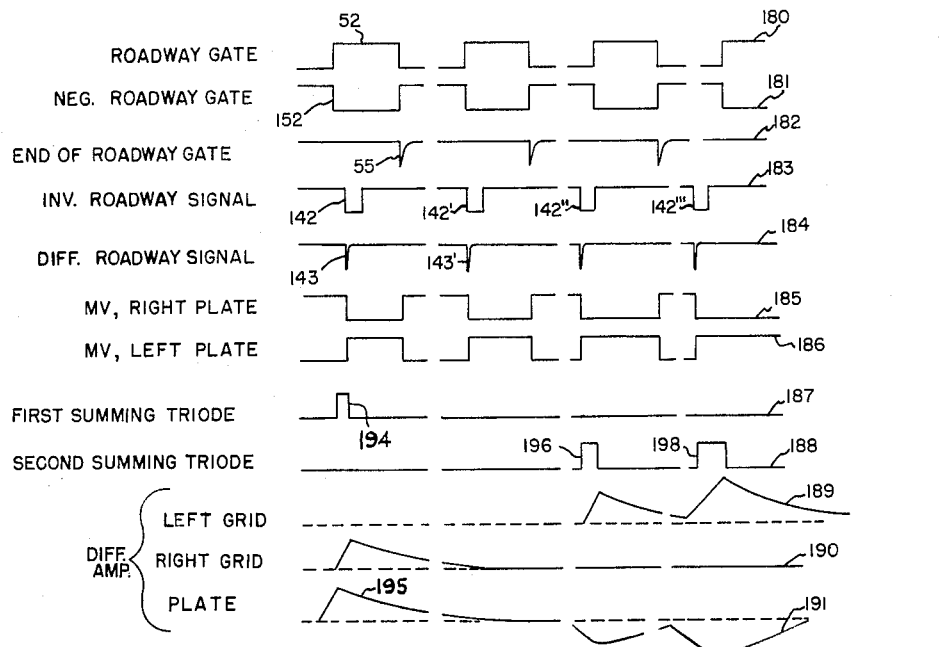
FIG. 7 is a chart showing the time relationships of the voltage variations at various points in the circuit shown in FIG. 6.

The various different curves shown in FIG. 7 are idealized voltage wave forms showing the time relationships between voltage changes at various different points of the circuit shown in FIG. 6, all of the curves being related to the same time scale, which serves as the abscissa. The two curves 180 and 181 at the top of the figure represent the floor gate 52 and the negative floor gate 152, respectively. The next curve 182 represents the differentiated and clamped floor gate 55 which triggers the multivibrator to one state. The next two curves 183 and 184 represent, respectively, the amplified, inverted floor signal 142, and its differential 143, which is applied at the right hand input of the multivibrator 140 for triggering it. The next two curves 185 and 186 represent the voltages relative to ground appearing at the respective right and left hand plates 154 and 148 of the multivibrator. The following two curves 187 and 188 represent the voltage changes at the plates of the respective summing triodes 150 and 156. The next two curves 189 and 190 represent the integrals of the immediately preceding curves 186 and 187, respectively, as they appear on the respective grids of the differential amplifier 160. The bottom curve 191 represents the output signal of the differential amplifier, taken from the left hand plate 168.

The curves 180 to 191 are selected to illustrate various different conditions and the manner in which the circuit operates to produce the desired output signals. As a first example, the inverted floor pulse signal 142 is shown as occurring slightly later than the start of the floor gate 52. This signal is differentiated by the capacitor 149' and the resistor 151' to produce the trigger signal 143, which triggers the multivibrator to the state in which its left hand plate 148 is non-conducting and at a relatively high potential, as shown by the curve 186. Previously to the occurrence of the signal 142, the left hand plate 148 is at a relatively low potential. During the interval between the start of the floor gate 52 and the occurrence of the slightly late signal 142, the negative floor gate 152 is present, and the first summing triode is cut off, producing a pulse signal 194 at its plate. The interval, and the pulse signal 194 end when the multivibrator 140 is triggered by the signal 143, rendering the left hand plate 148 again relatively positive, and thereby causing the first summing triode again to conduct. The signal 194 is integrated to produce the signal shown by the curve 190, which is applied to the right hand side of the differential amplifier 160, thereby causing the left hand plate 168 of the differential amplifier to become more positive, as shown by the portion 195 of the bottom curve 191. The increase in the potential of the plate 168 is applied to the target delay circuit 14 to lengthen its delay period, thus to bring the start of the floor gate 52 closer to coincidence with the next floor signal.

The next example illustrates the operation of the circuit in response to a signal 142', which occurs synchronously with the start of the floor gate 52. In this case, neither one of the summing triodes 150 and 156 becomes cut off at any time during the cycle of operation, and no output signal is applied to the differential amplifier 160.

The next two examples illustrate the response of the circuit to floor signals 142" and 142"', which occur at different respective times earlier than the start of their respective corresponding floor gates 52. These signals 142" and 142"' trigger the multivibrator to the state in which its right hand plate 154 is relatively negative. During the intervals between the occurrence of these floor signals 142" and 142"' and the start of the floor gate 52, the floor gate 52 is absent and the right hand plate 154 of the multivibrator is relatively negative, so that the second summing triode 156 is cut off, thereby producing the positive pulse signals 196 and 198 of the curve 188. The output of the second summing triode 156 is integrated to produce the signal shown by the curve 189, which is applied to the left hand side of the differential amplifier, thereby lowering the potential of the left hand plate 168 of the differential amplifier. Lowering of this potential shortens the period of the target delay circuit 14 to cause the floor gate 52 to start earlier on succeeding cycles, thereby tending to bring the start of the floor gate 52 again into coincidence with the leading edges of subsequent floor signals.

The illustrated coincidence circuit thus operates to maintain the desired time relationships in the system, and to compensate continuously and automatically for changes in the speed of sound, and also for changes in the characteristics of the delay circuits 14 and 18 such as may be caused by aging of the circuit components, climatic changes, or other causes. The circuit operates to compare the times of occurrence of the floor signal 142 and the leading edge of the floor gate 52, and to produce an output signal in response to a time difference between the two occurrences. The output signal is constituted by a departure from an equilibrium potential of the selected plate 168 or 170 of the differential amplifier, and is of one polarity if the floor gate 52 starts before the floor signal, and of the opposite polarity if the floor signal occurs before the start of the floor gate 52. Also, the magnitude of the output signal is directly proportional to the time difference between the two occurrences, so that a relatively large correction signal is applied to the target delay circuit 14 in response to a relatively large time difference between the start of the floor gate and the floor signal, while only a relatively small correction signal is applied in response to a relatively small difference.

While the invention has been described in connection with a specific embodiment thereof, it will be understood that it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinabove set forth, and as fall within the scope of the invention or the limits of the appended claims.

Having thus described my invention what I claim is:

1. Vehicle detecting apparatus comprising means for producing time-spaced pulses of acoustical energy, means for detecting parts of the energy pulses reflected from surfaces spaced from the producing means, signal producing means for producing a signal in response to the detection of the reflected portions thereof, and means for stabilizing the magnitude of the signals produced by the signal producing means in response to portions of the energy pulses reflected to the detecting means from the roadway over which the vehicles to be detected pass, said stabilizing means including auxiliary producing and detecting means generally similar to the aforesaid producing and detecting means, said auxiliary means being arranged out of the path of travel of the vehicles to be detected for directing acoustical pulses toward, and receiving portions thereof reflected only by a part of the roadway spaced from the path of travel of the vehicles to be detected, and feed-back means responsive to changes in the magnitude of the output of said auxiliary detecting means for adjusting the sensitivity of said auxiliary detecting means and for similarly adjusting the sensitivity of the aforesaid detecting means.

2. Vehicle detecting apparatus comprising means for producing time-spaced pulses of acoustical energy, means for detecting parts of the energy pulses reflected from surfaces spaced from the producing means, signal producing means for producing a signal in response to the detection of the reflected portions of the pulses, said signal producing means comprising two gated amplifiers and timing means for gating them, said timing means including first and second electrical delay circuits and first and second gate generators, means for triggering said first delay circuit in response to energization of the pulse producing means, means for triggering said first gate generator and said second delay circuit at the end of the delay period of said first delay circuit, means for triggering said second gate generator at the end of the delay period of said second delay circuit, and means for gating said amplifiers during operation of said first and said second gate generators, said first delay circuit being of the variable type, and means for varying the delay period of said first delay circuit in response to relatively small and gradual changes in the time difference between the production of selected ones of the energy pulses and the detection of the reflected portions thereof.

3. Vehicle detecting apparatus comprising means for producing time-spaced pulses of acoustical energy, means for detecting parts of the energy pulses reflected from surfaces spaced from the producing means, signal producing means for producing a signal in response to the detection of the reflected portions of the pulses, said signal producing means comprising two gated amplifiers and timing means for gating them, said timing means including a delay circuit responsive to the pulse producing means for producing a first trigger signal at a predetermined time after the production of each acoustical pulse, a first gate producing circuit responsive to said first trigger signal for producing a first gate starting substantially coincidentally with said first trigger, circuit means for applying said first gate to a first one of said gated amplifiers for gating it, means responsive to said first trigger signal for producing a second trigger signal at a predetermined time after said first trigger signal, second gate producing means responsive to said second trigger signal for producing a second gate starting substantially coincidentally with said second trigger signal, circuit means for applying said second gate to the second one of said amplifiers for gating it, said delay circuit being adjustable to effect adjustment of the timing of both of said gates, said delay circuit having a controllably variable delay characteristic, and control means for varying the delay of the delay circuit in response to a time interval between the occurrence of signals produced by the signal producing means in response to energy reflected from the roadway over which the vehicles to be counted travel and the start of said second gate, thereby to maintain time coincidence between the selected signals and the start of said second gate.

References Cited by the Examiner

UNITED STATES PATENTS

| 3,045,909 | 7/1962 | Auer | 340—38 |
| 3,063,179 | 11/1962 | Auer | 340—38 |
| 3,102,252 | 8/1963 | Botton | 340—38 |
| 3,110,007 | 11/1963 | Frielinghaus | 340—38 |

NEIL C. READ, *Primary Examiner.*

THOMAS B. HABECKER, *Examiner.*